United States Patent
Bermudez Martinez et al.

(10) Patent No.: US 10,830,921 B2
(45) Date of Patent: *Nov. 10, 2020

(54) LOGGING AND CORRELATION PREDICTION PLOT IN REAL-TIME

(71) Applicant: Petrolink International Ltd., Douglas (IM)

(72) Inventors: Rafael Angel Bermudez Martinez, Houston, TX (US); Concepcion Isidro Olán, Tabasco (MX)

(73) Assignee: Petrolink International Ltd., Douglas (IM)

( * ) Notice: Subject to any disclaimer, the term of this patent is extended or adjusted under 35 U.S.C. 154(b) by 0 days.

This patent is subject to a terminal disclaimer.

(21) Appl. No.: 16/244,561

(22) Filed: Jan. 10, 2019

(65) Prior Publication Data

US 2019/0146118 A1 May 16, 2019

Related U.S. Application Data

(63) Continuation of application No. 15/343,836, filed on Nov. 4, 2016, now Pat. No. 10,209,400, which is a continuation of application No. 13/919,240, filed on Jun. 17, 2013, now Pat. No. 9,518,459.

(60) Provisional application No. 61/660,565, filed on Jun. 15, 2012.

(51) Int. Cl.
*G01V 99/00* (2009.01)
*E21B 44/00* (2006.01)
*E21B 47/007* (2012.01)
*E21B 47/06* (2012.01)
(Continued)

(52) U.S. Cl.
CPC .............. *G01V 99/00* (2013.01); *E21B 44/00* (2013.01); *E21B 47/007* (2020.05); *E21B 47/06* (2013.01); *G01V 3/20* (2013.01); *G01V 99/005* (2013.01); *G06T 11/206* (2013.01)

(58) Field of Classification Search
CPC .. G01V 99/00; G01V 99/005; E21B 47/0006; E21B 47/06; E21B 44/00; G06Q 10/0639; G06Q 10/06395; G06T 11/206
See application file for complete search history.

(56) References Cited

U.S. PATENT DOCUMENTS

| | | |
|---|---|---|
| 4,205,371 A | 5/1980 | Feather |
| 5,128,866 A | 7/1992 | Weakley |
| 6,109,368 A | 8/2000 | Goldman et al. |

(Continued)

OTHER PUBLICATIONS

HALLIBURTON / Landmark Software & Services, "Drillworks® User Guide", Oct. 2009.

(Continued)

*Primary Examiner* — Toan M Le
(74) *Attorney, Agent, or Firm* — Shackelford, Bowen, McKinley & Norton, LLP

(57) ABSTRACT

In one embodiment, a method includes facilitating a real-time display of drilling-performance data for a current well. The method further includes receiving new channel data for the current well from a wellsite computer system. The method also retrieving input data including historical drilling-performance data for an offset well relative to the current well. In addition, the method includes computing calculated data for the current well based on the channel data and the input data. Moreover, the method includes updating the real-time display with the calculated data.

20 Claims, 3 Drawing Sheets

(51) Int. Cl.
*G01V 3/20* (2006.01)
*G06T 11/20* (2006.01)

(56) References Cited

U.S. PATENT DOCUMENTS

| | | | |
|---|---|---|---|
| 6,411,902 B1 | 6/2002 | Wiltshire | |
| 6,749,029 B2 | 6/2004 | Alft et al. | |
| 6,826,486 B1 | 11/2004 | Malinverno | |
| 7,054,750 B2 | 5/2006 | Rodney et al. | |
| 7,066,284 B2 | 6/2006 | Wylie et al. | |
| 7,142,986 B2 | 11/2006 | Moran | |
| 7,225,879 B2 | 6/2007 | Wylie et al. | |
| 7,341,117 B2 | 3/2008 | Wylie et al. | |
| 7,542,979 B2 | 6/2009 | Gupta et al. | |
| 7,571,777 B2 | 8/2009 | Wylie et al. | |
| 7,606,666 B2 | 10/2009 | Repin et al. | |
| 7,836,973 B2 | 11/2010 | Belcher et al. | |
| 7,980,312 B1 | 7/2011 | Hill et al. | |
| 8,011,446 B2 | 9/2011 | Wylie et al. | |
| 8,122,975 B2 | 2/2012 | Belcher et al. | |
| 8,316,936 B2 | 11/2012 | Roddy et al. | |
| 8,615,374 B1 | 12/2013 | Discenzo | |
| 9,191,266 B2 | 11/2015 | Abraham et al. | |
| 9,512,707 B1 | 12/2016 | Bermudez Martinez | |
| 9,518,459 B1 | 12/2016 | Bermudez Martinez et al. | |
| 10,209,400 B2 * | 2/2019 | Bermudez Martinez | E21B 44/00 |
| 2003/0074139 A1 | 4/2003 | Poedjono | |
| 2004/0019696 A1 | 1/2004 | Scott et al. | |
| 2004/0149431 A1 | 8/2004 | Wylie et al. | |
| 2005/0063251 A1 | 3/2005 | Guidry et al. | |
| 2005/0197777 A1 | 9/2005 | Rodney et al. | |
| 2005/0209866 A1 | 9/2005 | Veeningen et al. | |
| 2005/0241855 A1 | 11/2005 | Wylie et al. | |
| 2005/0267899 A1 | 12/2005 | Gupta et al. | |
| 2006/0173625 A1 | 8/2006 | Moran | |
| 2007/0047279 A1 | 3/2007 | Evans et al. | |
| 2007/0061081 A1 | 3/2007 | Moran | |
| 2007/0089508 A1 | 4/2007 | Allmendinger | |
| 2007/0185696 A1 | 8/2007 | Moran et al. | |
| 2007/0187146 A1 | 8/2007 | Wylie et al. | |
| 2007/0252717 A1 | 11/2007 | Fielder | |
| 2007/0284147 A1 | 12/2007 | Moran | |
| 2008/0060846 A1 | 3/2008 | Belcher et al. | |
| 2008/0071817 A1 | 3/2008 | Gaurav et al. | |
| 2008/0087423 A1 | 4/2008 | Wylie et al. | |
| 2008/0179094 A1 | 7/2008 | Repin et al. | |
| 2008/0181230 A1 | 7/2008 | Hitt et al. | |
| 2008/0184269 A1 | 7/2008 | Avery et al. | |
| 2008/0208475 A1 | 8/2008 | Karr et al. | |
| 2008/0262810 A1 | 10/2008 | Moran et al. | |
| 2008/0294606 A1 | 11/2008 | Moran et al. | |
| 2009/0090555 A1 | 4/2009 | Boone et al. | |
| 2009/0132458 A1 | 5/2009 | Edwards et al. | |
| 2009/0159336 A1 | 6/2009 | Boone | |
| 2009/0182472 A1 | 7/2009 | Singh et al. | |
| 2009/0234584 A1 | 9/2009 | Casey et al. | |
| 2009/0254569 A1 | 10/2009 | Paulk et al. | |
| 2009/0308616 A1 | 12/2009 | Wylie et al. | |
| 2010/0005111 A1 | 1/2010 | Bal et al. | |
| 2010/0179963 A1 | 7/2010 | Conner et al. | |
| 2010/0191511 A1 | 7/2010 | Hsu et al. | |
| 2010/0204972 A1 | 8/2010 | Hsu et al. | |
| 2010/0217530 A1 | 8/2010 | Boone | |
| 2010/0259415 A1 | 10/2010 | Strachan et al. | |
| 2011/0106856 A2 | 5/2011 | Paulk et al. | |
| 2011/0114387 A1 | 5/2011 | Belcher et al. | |
| 2011/0132662 A1 | 6/2011 | Dennis | |
| 2011/0166843 A1 | 7/2011 | Hsu et al. | |
| 2011/0170373 A1 | 7/2011 | Hsu et al. | |
| 2011/0174541 A1 | 7/2011 | Strachan et al. | |
| 2011/0175899 A1 | 7/2011 | Bittar et al. | |
| 2013/0013677 A1 | 1/2013 | Engstrom et al. | |
| 2013/0135115 A1 | 5/2013 | Johnson et al. | |
| 2013/0254416 A1 | 9/2013 | Abraham et al. | |
| 2015/0347565 A1 | 12/2015 | Abraham et al. | |
| 2016/0281490 A1 | 9/2016 | Samuel | |
| 2016/0281498 A1 | 9/2016 | Nguyen et al. | |
| 2017/0051601 A1 | 2/2017 | Bermudez Martinez | |
| 2017/0052282 A1 | 2/2017 | Bermudez Martinez et al. | |
| 2019/0213205 A1 | 7/2019 | Abraham et al. | |

OTHER PUBLICATIONS

Martínez, R.B., Petrolink Services, Inc., and Olán, C.I., Petrolink Services, Inc., "Improving Real-Time Drilling Optimization Applying Engineering Performance From Offset Wells." SPWLA 53rd Annual Logging Symposium, Jun. 16-20, 2012.

Khudiri, M.M. and Shehry, M.A., Saudi Aramco, and Curtis, J.D., Petrolink International, "Data Architecture of Real-Time Drilling and Completions Information at Saudi Aramco;" SPE 116848, 2008 SPE Russian Oil & Gas Technical Conference and Exhibition, Moscow, Russia, Oct. 28-30, 2008.

Pérez-Téllez, C., Rodríguez, R., and Ramírez, I., PEMEX Drilling Business Unit, and Bermúdez-Martinez, R.A., and Palavicini-Cham, C.A., Petrolink Services Inc., "Applying a Real-Time Engineering Methodology to Drill Ahead of Potential Undesirable Events;" OTC 23180, Offshore Technology Conference, Houston, Texas, USA, Apr. 30-May 3, 2012.

González, Édgar, "U.S. Appl. No. 15/446,761", filed Mar. 1, 2017.

Bermudez Martinez, Rafael Angel, "U.S. Appl. No. 14/477,444", filed Sep. 4, 2014.

McLaren, et al., "Improving the Value of Real-Time Drilling Data to Aid Collaboration, Drilling Optimization, and Decision Making," Nov. 11-14, 2007, 2007 SPE Annual Technical Conference and Exhibition, Anaheim, CA, pp. 1-13.

* cited by examiner

LOGGING AND CORRELATION PREDICTION PLOT IN REAL-TIME

CROSS-REFERENCE TO RELATED APPLICATIONS

This patent application is a continuation of U.S. patent application Ser. No. 15/343,836, filed Nov. 4, 2016, now U.S. Pat. No. 10,209,400. U.S. patent application Ser. No. 15/343,836 is a continuation of U.S. patent application Ser. No. 13/919,240, filed on Jun. 17, 2013, now U.S. Pat. No. 9,518,459. U.S. Patent Application Ser. No. 13/919,240 claims priority from U.S. Provisional Patent Application No. 61/660,565, filed on Jun. 15, 2012. U.S. patent application Ser. Nos. 13/919,240 and 15/343,836 and U.S. Provisional Patent Application No. 61/660,565 are incorporated by reference in their entirety.

BACKGROUND

Technical Field

The present invention relates generally to drilling analytics and more particularly, but not by way of limitation, to systems and methods for enabling real-time drilling-performance analysis.

History of Related Art

As will be appreciated by one of ordinary skill in the art, well control is a practice used in oil and gas operations such as drilling to maintain the fluid column hydrostatic pressure to prevent, inter alia, influx of formation fluids into a wellbore and unintentional fracture of a rock structure of a formation. The term formation encompasses soil, rock, and the like that are encountered when drilling. Well control often involves the estimation of pressures, the strength of the subsurface formations, and the use of casing and mud density to offset those pressures in a predictable fashion.

Two indicators that are frequently used in well control are pore pressure and fracture gradient. Pore pressure refers to the pressure of groundwater held within a soil or rock in gaps between particles (i.e., pores). A fracture gradient refers to an amount of pressure necessary to permanently deform, or fracture, a rock structure of a formation. Various methods are known for predicting pore pressure and fracture gradient. For example, one such method is known as the Eaton method. By way of further example, another such method is known as the Matthews and Kelly method.

While methods exist for predicting pore pressure and fracture gradient, it is not generally feasible to perform and have access to these predictions in real time as wells are being drilled. In addition, it is also not generally possible to predict events in real time such as, for example, lost circulation or a stuck pipe.

SUMMARY OF THE INVENTION

In one embodiment, a method includes, on a central computing system comprising at least one server computer, facilitating a real-time display of drilling-performance data for a current well. The method further includes the central computing system receiving new channel data for the current well from a wellsite computer system. In addition, the method includes the central computing system retrieving input data comprising historical drilling-performance data for an offset well relative to the current well. The method also includes the central computing system computing calculated data for the current well based on the channel data and the input data. Additionally, the method includes the central computing system updating the real-time display with the calculated data.

In one embodiment, a system includes at least one server computer. The at least one server computer is operable to perform a method. The method includes facilitating a real-time display of drilling-performance data for a current well. The method further includes receiving new channel data for the current well from a wellsite computer system. The method also retrieving input data comprising historical drilling-performance data for an offset well relative to the current well. In addition, the method includes computing calculated data for the current well based on the channel data and the input data. Moreover, the method includes updating the real-time display with the calculated data.

In one embodiment, a computer-program product includes a computer-usable medium having computer-readable program code embodied therein. The computer-readable program code is adapted to be executed to implement a method. The method includes facilitating a real-time display of drilling-performance data for a current well. The method further includes receiving new channel data for the current well from a wellsite computer system. The method also retrieving input data comprising historical drilling-performance data for an offset well relative to the current well. In addition, the method includes computing calculated data for the current well based on the channel data and the input data. Moreover, the method includes updating the real-time display with the calculated data.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

In various embodiments, real-time drilling-performance analytics such as, for example, pore pressure and fracture gradient, can be facilitated by leveraging historical drilling-performance data from offset wells. As one of ordinary skill in the art will appreciate, an offset well is a pre-existing well that is in close proximity to the current well. For example, an offset well can be located adjacently to the current well according to spacing rules defined by applicable law. However, it should be appreciated that immediate adjacency need not be required.

Figure 1:
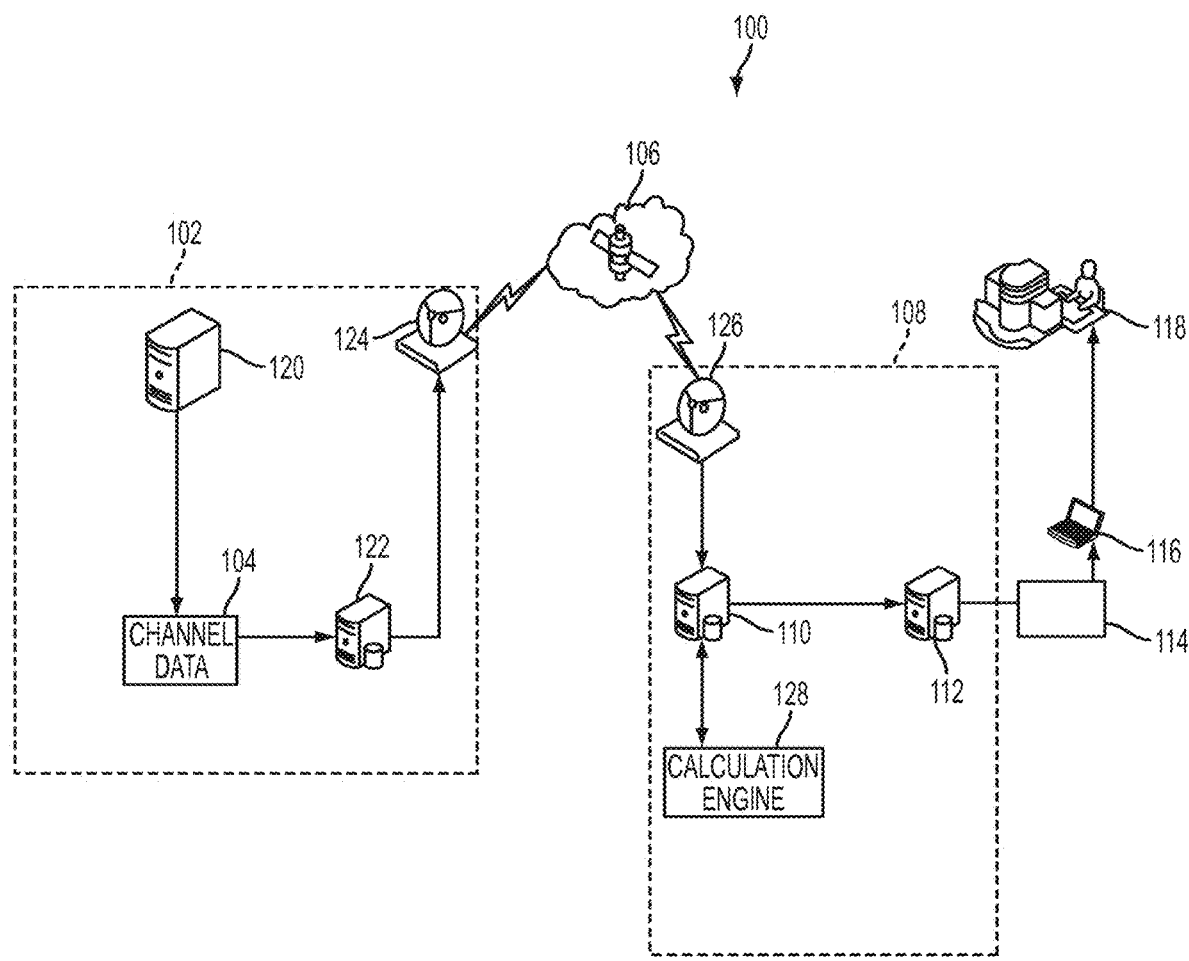
FIG. 1 illustrates a system for facilitating real-time drilling-performance analysis.

FIG. 1 illustrates a system 100 for facilitating real-time drilling-performance analysis. The system 100 includes a wellsite computer system 102, a central computing system 108, and a communications network 106. The wellsite computer system 102 includes a collection server 120, a remote-integration server 122, and a network link 124. The central computing system 108 includes a main server 110, a repository server 112, and a network link 126. It should be appreciated that the depicted configurations of the central computing system 108 and the wellsite computer system 102 are illustrative in nature. The central computing system 108 and the wellsite computer system can each include any number of physical or virtual server computers and databases. For example, in various embodiments, the remote-integration server 122 may be omitted or have its functionality integrated into the collection server 120. Other modifications and rearrangements will be apparent to one of ordinary skill in the art after reviewing inventive principles contained herein.

In a typical embodiment, the wellsite computer system 102 is located at or near a wellsite for a current well and communicates with the central computing system 108 over the communications network 106. The communications network 106 may include, for example, satellite communication between the network link 124 of the wellsite computer system 102 and the network link 126 of the central computing system 108. Thus, the network link 124 and the network link 126 can be, for example, satellite links. For simplicity of description, communication between the wellsite computer system 102 and the central computing system 108 may be described below without specific reference to the network link 124, the network link 126, and the communications network 106.

Using, for example, logging while drilling (LWD), the collection server 120 receives and/or generates channel data 104 (e.g., in WITS0) via data received from sensors that are in use at the wellsite. A given sensor or other source of data is referred to herein as a "channel." Data from a channel may be referred to as "channel data," which term is inclusive of both raw data and metadata. The raw data includes, for example, measured data determined by the sensor or source. The measured data can include, for example, resistivity, porosity, permeability, density, and gamma-ray data. The metadata includes information about the raw data such as, for example, time, depth, identification information for the channel, and the like. The collection server 120 transmits the channel data 104 to the remote-integration server 122, which communicates the channel data 104 to the central computing system 108 in real-time.

On the central computing system 108, the main server 110 receives the channel data 104 from the wellsite computer system 102 and converts the channel data 104 to a common data format. The conversion of channel data to a common data format is described in detail in U.S. patent application Ser. No. 13/829,590, which application is hereby incorporated by reference. As shown, the main server 110 has a calculation engine 128 resident thereon. Via the calculation engine 128, the main server 110 generates calculated data in real-time based on the channel data 104. The calculation engine 128 can be, for example, a software application that implements algorithms to generate the calculated data. Based on gamma-ray and resistivity data and other input data described with respect to FIG. 3, the calculated data can include, for example, pore pressure and a fracture gradient.

The calculation engine 128 can also maintain settings that are utilized for generating the calculated data. For example, implementation of Eaton and/or Mathews-and-Kelly algorithms may require certain parameters such as an Eaton exponent, a matrix stress coefficient, and a Poisson ratio. In a typical embodiment, the settings maintained on the main server 110 specify values for such parameters. If the value to be used for a given parameter is not constant all across all wells (e.g. varying based on geography or well-specific data), the settings further specify rules for selecting or calculating the value, as applicable. The settings permit the calculation engine 128 to acquire necessary parameters without the need for individual configuration for each well.

The repository server 112 stores and maintains the channel data 104 and any calculated data according to the common data format. Storage and maintenance of data according to the common data format is described in detail in U.S. patent application Ser. No. 13/829,590, which application is incorporated by reference above. In a typical embodiment, the repository server 112 stores channel data from a plurality of wellsite computer systems located at a plurality of wellsites in this fashion. In addition, the repository server 112 typically maintains historical drilling-performance data (e.g., channel data, calculated data, etc.) for offset wells relative to the current well.

The repository server 112 facilitates a real-time display 114 of drilling-performance data related to the wellsite. In a typical embodiment, the real-time display 114 is provided via a network such as, for example, the Internet, via a web interface. In a typical embodiment, the real-time display 114 includes gamma-ray and resistivity data for a formation being drilled. The real-time display 114 is shown and updated in real time on a computing device 116 as the channel data 104 is received. In a typical embodiment, as described with respect to FIGS. 2 and 3, the real-time display 114 allows engineering personnel 118 to perform real-time drilling analysis for the wellsite.

For purposes of illustration, examples of equations that can be used to compute calculated data will now be described. In some embodiments, pore pressure (Pp) can be computed using the Eaton method as embodied in Equation 1 below, where S represents stress (i.e. pressure exerted by the weight of the rocks and contained fluids thereabove in units of, e.g., g/cc), PPN represents normal pore pressure according to a hydrostatic gradient, Ro represents observed resistivity, Rn represents normal resistivity, and x represents an Eaton exponent.

$$Pp = S - (S - PPN)\left(\frac{Ro}{Rn}\right)^x \qquad \text{Equation 1}$$

For purposes of this example, S, PPN, Ro, and Rn are input data for calculating pore pressure. In particular, S and Ro are examples of parameters that can be provided by channel data for the current well. The Eaton exponent (x) is an example of a parameter that can be retrieved from settings maintained by the calculation engine 128 of FIG. 1. In some embodiments, PPN can also be retrieved from settings maintained by the calculation engine 128. In a typical embodiment, Rn is obtained using historical drilling-performance data for an offset well. In this fashion, pore pressure for the current well can be calculated in real-time by retrieving resistivity data for the offset well. A specific example will be described with respect to FIG. 3.

In various embodiments, a fracture gradient (Fg) can be computed using the Eaton method as embodied in Equation 2 below, where Pp and S represent pore pressure and stress, respectively, as described above and v represents a Poisson ratio.

$$Fg = Pp + (S - Pp)\left(\frac{v}{1-v}\right) \qquad \text{Equation 2}$$

For purposes of the example of Equation 2, stress (S), pore pressure (Pp) and the Poisson ratio (v) are input data for calculating a fracture gradient for a current well. Pp can be computed as described with respect to Equation 1 above. Stress (S) can also be obtained as described with respect to Equation 1. The Poisson ratio (v) is an example of an input value that can be retrieved from settings maintained by the calculation engine 128 as described with respect to FIG. 1.

In various embodiments, a fracture gradient (Fg) can also be computed using the Matthews and Kelly method as embodied in Equation 3 below, where Pp and S represent pore pressure and stress, respectively, as described above and $\kappa_i$ represents a matrix stress coefficient.

$$Fg=Pp+(S-Pp)\kappa_i \qquad \text{Equation 3}$$

For purposes of the example of Equation 3, stress(S), pore pressure (P) and the matrix stress coefficient ($\kappa_i$) are input data for calculating a fracture gradient for a current well. The pore pressure (Pp) and stress (S) can be obtained as described with respect to Equation 2. $\kappa_i$ is an example of an input value that can be retrieved from settings maintained by the calculation engine 128 as described with respect to FIG. 1.

Figure 2:
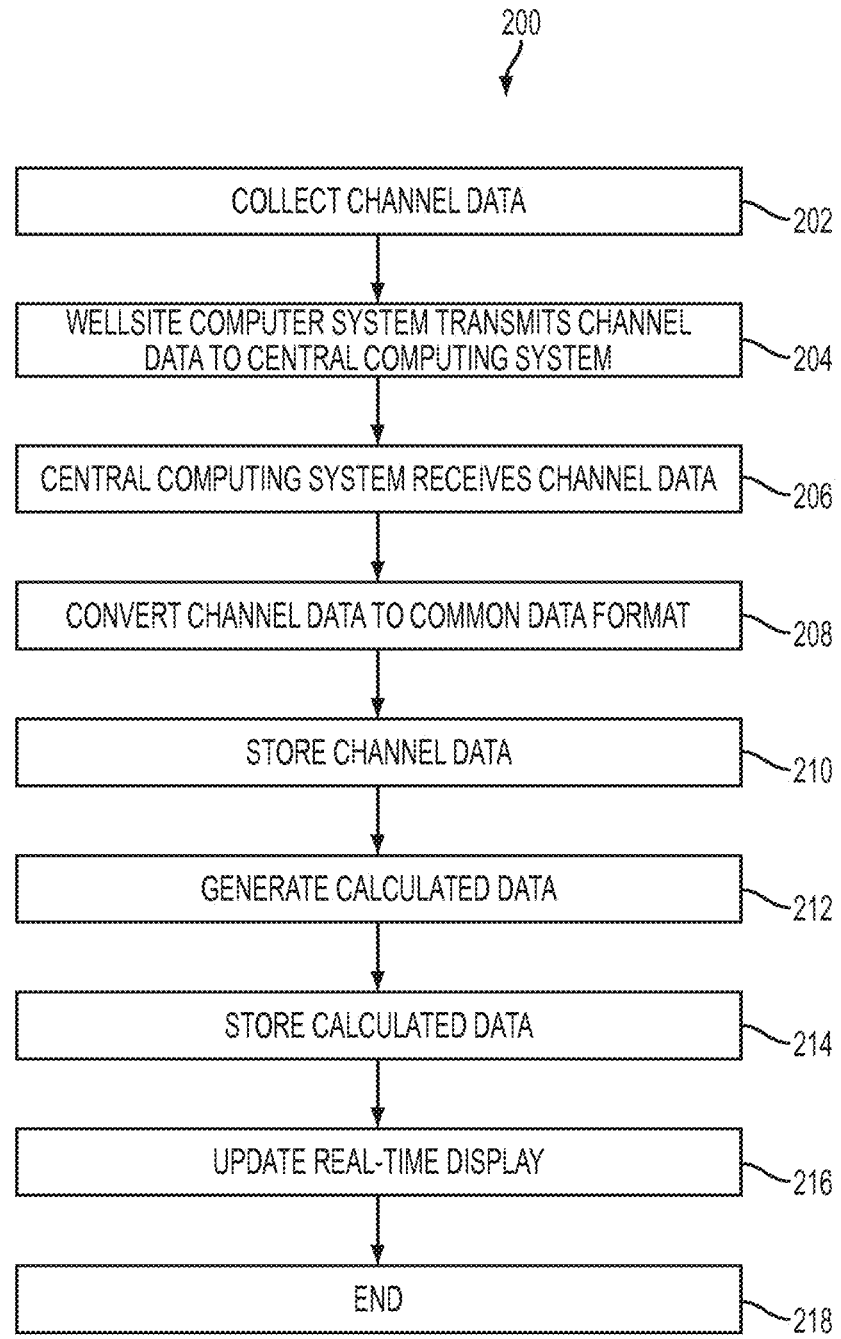
FIG. 2 illustrates a process for performing real-time drilling analysis.

FIG. 2 illustrates a process 200 for performing real-time drilling analysis using the system 100 of FIG. 1. At step 202, the wellsite computer system 102 collects the channel data 104 in real-time from sensors via, for example, LWD. The channel data 104 is received in an initial data format such as, for example, WITS0. From step 202, the process 200 proceeds to step 204. At step 204, the wellsite computer system 102 transmits the channel data 104 to the central computing system 108 via the communications network 106. From step 204, the process 200 proceeds to step 206. At step 206, the central computing system 108 receives the channel data from the wellsite computer system 102. From step 206, the process 200 proceeds to step 208.

At step 208, the central computing system 108 converts the channel data 104 to a common data format. From step 208, the process 200 proceeds to step 210. At step 210, the channel data 104 is stored on the central computing system 108 according to the common data format. From step 210, the process 200 proceeds to step 212. At step 212, the calculation engine 128 generates calculated data based on the channel data 104, settings, and other input data described with respect to FIG. 3. As described above, the calculation engine 128 may be, for example, a software application that implements algorithms to generate the calculated data. From step 212, the process 200 proceeds to step 214. At step 214, the central computing system 108 stores the calculated data. For example, the calculated data can be stored on the repository server 112. From step 214, the process 200 proceeds to step 216. At step 216, the central computing system 108 updates the real-time display 114 to include selected data such as, for example, all or part of the channel data 104 and all or part of the calculated data. An example of the real-time display 114 will be described in greater detail with respect to FIG. 3. From step 216, the process 200 proceeds to step 218. At step 218, the process 200 ends.

Figure 3:
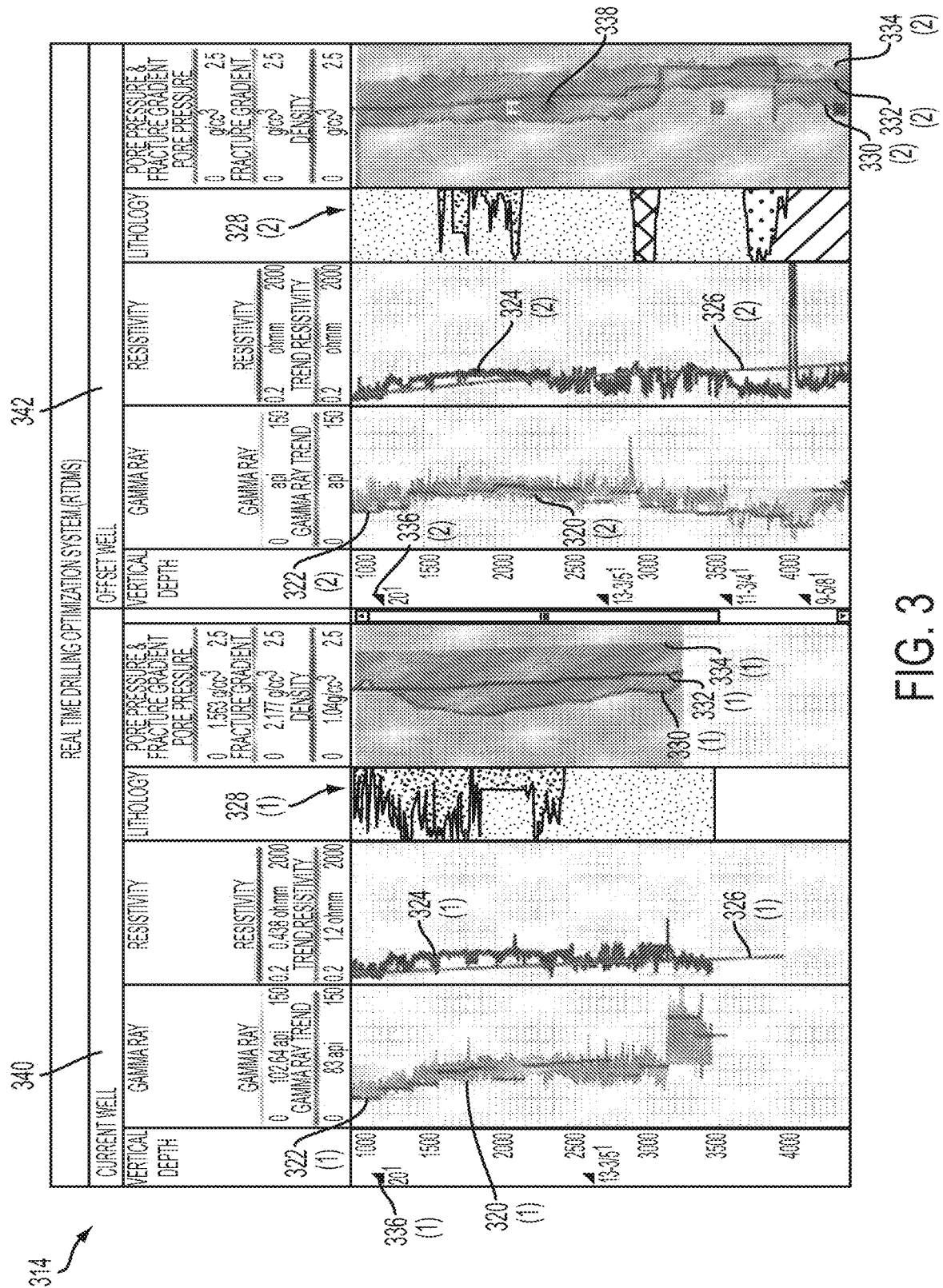
FIG. 3 illustrates an example of real-time drilling-performance analysis via a real-time display.

FIG. 3 illustrates an example of real-time drilling-performance analysis via a real-time display 314. To facilitate comparative analysis, for example, by a drilling engineer, the real-time display 314 depicts drilling-performance data for both a current well 340 and an offset well 342 relative to true vertical depth (TVD). In a typical embodiment, the offset well 342 is pre-selected and associated with the current well 340 due to its geographic proximity to the current well 340. In various embodiments, the pre-selection can be made by drilling personnel such as a drilling engineer and stored by a repository server such as the repository server 112 of FIG. 1.

The drilling-performance data depicted by the real-time display 314 can include, inter alia, selected channel data, input data, calculated data, casing-point data, and event data. The selected channel data includes, for example, channel data from a well site that is received at a central computing system, converted to a common data format, and stored as described with respect to FIGS. 1 and 2. The input data is additional data that is received, for example, from a drilling engineer or from other data stored within a repository such as a repository maintained by the repository server 112 of FIG. 1. The calculated data is data that is calculated, for example, by a calculation engine such as the calculation engine 128 of FIG. 1. The casing-point data includes information related to the placement and size of casing utilized in a given well. The event data is data related to certain detected events at a well such as, for example, a stuck pipe, lost circulation, or a kick (i.e., undesired influx of formation fluid into the wellbore).

With respect to the current well 340, the real-time display 314 shows selected channel data, input data, calculated data, and casing-point data. In particular, the selected channel data for the current well 340 includes gamma-ray data 320(1), resistivity data 324(1), lithography 328(1), and fluid density 332(1). The input data for the current well 340 includes gamma-ray trend lines 322(1) (also referred to herein as shale lines) and a resistivity-trend line 326(1) (also referred to herein as a normal compaction trend). The calculated data for the current well 340 includes pore pressure 330(1) and fracture gradient 334(1). The casing-point data includes one or more casing points 336(1) (which are updated in real time).

With respect to the offset well 342, the real-time display 314 shows selected channel data, input data, calculated data, casing-point data, and event data. It should be appreciated that all such data for the offset well 342 is generally historical drilling-performance data (as opposed to real-time data for the current well 340). In particular, the selected channel data for the offset well 342 includes gamma-ray data 320(2), resistivity data 324(2), lithography 328(2), and fluid density 332(2). The input data for the offset well 342 includes gamma-ray trend lines 322(2) (also referred to herein as shale lines) and a resistivity-trend line 326(2) (also referred to herein as a normal compaction trend). The calculated data for the current well 340 includes pore pressure 330(2) and fracture gradient 334(2). The casing-point data includes one or more casing points 336(2). The event data for the offset well 342 includes one or more drilling events 338.

With respect to the current well 340, acquisition of the input data will now be described. As mentioned above, the selected channel data for the current well 340 is displayed and refreshed in real-time as such data is received by a central computing system such as, for example, the central computing system 108 of FIG. 1. As the selected channel data is received, the central computing system 108 gathers the input data, i.e., the gamma-ray trend lines 322(1) and the resistivity-trend line 326(1). In a typical embodiment, the gamma-ray trend lines 322(1) are traced by drilling personnel such as, for example, a drilling, geological or geophysical engineer, who determines points of shale. Shale, as one of ordinary skill in the art will appreciate, generally emit more gamma rays than other sedimentary rocks. The gamma-ray trend lines 322(1) generally connect points of shale and represent an average of the gamma-ray data 320(1)

between those shale points (i.e. spanning that trend line). For example, in various embodiments, a drilling engineer may be prompted at configurable points in time to trace the gamma-ray trend lines.

The resistivity-trend line 326(1) is typically acquired automatically from historical drilling-performance data for the offset well 342. In that way, the resistivity-trend line 326(2) (i.e., the normal compaction trend for the offset well 342) serves as the resistivity-trend line 326(1). The resistivity-trend line 326(2) is a normalization of the resistivity data 324 for the offset well 342.

The calculated data for the current well 340 is generated by a central computing system such as, for example, the central computing system 108 of FIG. 1, based on the selected channel data and the input data for the current well 340. In a typical embodiment, the calculated data for the current well 340 has defined relationships, established on the central computing system 108 of FIG. 1, with the selected channel data and the input data. Particularly, the gamma-ray data 320(1), the gamma-ray trend lines 322(1), the resistivity data 324(1), and the resistivity-trend line 326(1) are leveraged by a calculation engine such as, for example, the calculation engine 128, to compute the pore pressure 330(1) and the fracture gradient 334(1) in real time. In that way, published algorithms such as those developed by Eaton and Matthews and Kelly may be used in real time to compute the pore pressure 330(1) and the fracture gradient 334(1).

Moreover, the real-time display 314 also enables other types of real-time drilling-performance analyses. As one example of real-time drilling-performance analysis, the real-time display 314 enables drilling personnel such as, for example, drilling engineers, to perform real-time geopressure analysis. Drilling engineers are able to compare the pore pressure 330(1) and the fracture gradient 334(1) for the current well 340 with the pore pressure 330(2) and the fracture gradient 334(2) for the offset well. This real-time geopressure analysis allows drilling engineers to compare trends and anticipate changes based on the offset well 342. The geopressure analysis can also be correlated with the one or more drilling events 338, as described further below.

Further real-time drilling-performance analysis is enabled by the one or more drilling events 338. Each of the one or more drilling events 338 is typically plotted at a depth at which a defined adverse drilling event occurred in the offset well 342. The one or more drilling events 338 can include, for example, stuck pipes, lost circulation, kicks, and the like. As a result of the geographic proximity between the current well 340 and the offset well 342, circumstances that led to the one or more drilling events 338 are often likely to reoccur at similar depths in the current well 340. Therefore, the real-time display 314 allows drilling personnel to anticipate and plan for the one or more drilling events 338. In a typical embodiment, when the depth of the current well 340 is within a preconfigured distance of the depth at which one of the one or more drilling events 338 occurred (e.g., 500 feet), an alert is generated and presented to responsible personnel. The alert can be, for example, a beep or alarm. Responsive to the alert, the responsible personnel may perform, for example, the real-time geopressure analysis described above so that it can be determined if the pore pressure 330(1) is trending similarly to the pore pressure 330(2). Corrective action such as an adjustment in the fluid density 332(1) may be taken.

As another example of real-time drilling-performance analysis, the real-time display 314 further enables casing-point prediction. As described above, the real-time display 314 shows the one or more casing points 336(1) for the current well 340 and the one or more casing points 336(2) for the offset well 342. Using data from the casing points 336(2), drilling personnel are able to predict both size and placement for future casing points for the current well 340.

A further example of real-time drilling-performance analysis enabled by the real-time display 314 relates to density analysis. As described above, the real-time display 314 displays both the fluid density 332(1) for the current well 340 and the fluid density 332(2) for the offset well 342. By reviewing and comparing density trends, drilling personnel such as, for example, drilling engineers, are able to determine if the fluid density 332(1) for the current well 340 should be increased, decreased, or maintained.

In a typical embodiment, the real-time display 314 can be customized based on the desires of drilling engineers. For example, the selected channel data can include more, less, or different channel data than described above. Likewise, the calculated data can have defined relationships with other channel data and/or input data for purposes of performing different calculations in real time.

Finally, real-time drilling performance analyses such as those described above allow drilling personnel such as, for example, drilling, geological, or geophysical engineers, to reduce non-productive time (NPT). Alerts, recommendations, and real-time displays such as those described above allow drilling personnel to perform better analyses more quickly and more efficiently. The automation provided by a system such as, for example, the real-time drilling-performance analysis system 100 of FIG. 1, frees drilling personnel from manually gathering information necessary to analyze and make decisions regarding the drilling performance of a well.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, by a computer system:
   collecting channel data in real-time as the channel data is generated, the channel data comprising measured physical properties determined by sensors in use at a site of a first well;
   providing a real-time display of performance data for the first well;
   retrieving input data comprising historical performance data for a second well, wherein the historical performance data comprises an event for the second well;
   updating the real-time display with the event for the second well; and
   generating an alert responsive to a determination that a measured depth for the first well is within a preconfigured distance of a depth associated with the event for the second well.

2. The method of claim 1, wherein the performance data comprises casing-point data for the first well and the second well.

3. The method of claim 1, wherein the event for the second well comprises event data for an adverse drilling event that previously occurred with respect to the second well.

4. The method of claim 1, comprising:
   computing data for the first well based on the channel data comprising measured physical properties determined by sensors in use at the site of the first well and input data comprising the historical performance data for the second well; and updating the real-time display with the computed data.

5. The method of claim 4, wherein the real-time display comprises a comparative display of at least a portion of the historical performance data for the second well and at least a portion of the performance data for the first well relative to depth.

6. The method of claim 4, wherein the computed data comprises pore pressure.

7. The method of claim 6, wherein:
the input data comprises resistivity data for the second well;
the channel data comprises resistivity data for the first well; and
the computing comprises computing the pore pressure using the resistivity data for the first well and the resistivity data for the second well.

8. The method of claim 6, wherein the computed data comprises a fracture gradient.

9. The method of claim 8, wherein the retrieving comprises retrieving at least a portion of the input data from settings maintained by a calculation engine resident on the computing system.

10. The method of claim 9, wherein the at least a portion of the input data comprises at least one of a matrix stress coefficient and a Poisson ratio.

11. A system comprising a processor and memory, wherein the processor and memory in combination are operable to implement a method comprising:
collecting channel data in real-time as the channel data is generated, the channel data comprising measured physical properties determined by sensors in use at a site of a first well;
providing a real-time display of performance data for the first well;
retrieving input data comprising historical performance data for a second well, wherein the historical performance data comprises an event for the second well;
updating the real-time display with the event for the second well; and
generating an alert responsive to a determination that a measured depth for the first well is within a preconfigured distance of a depth associated with the event for the second well.

12. The system of claim 11, wherein the performance data comprises casing-point data for the first well and the second well.

13. The system of claim 11, wherein the event for the second well comprises event data for an adverse drilling event that previously occurred with respect to the second well.

14. The system of claim 11, the method comprising:
computing data for the first well based on the channel data comprising measured physical properties determined by sensors in use at the site of the first well and input data comprising the historical performance data for the second well; and
updating the real-time display with the computed data.

15. The system of claim 14, wherein the real-time display comprises a comparative display of at least a portion of the historical performance data for the second well and at least a portion of the performance data for the first well relative to depth.

16. The system of claim 14, wherein the computed data comprises pore pressure.

17. The system of claim 16, wherein:
the input data comprises resistivity data for the second well;
the channel data comprises resistivity data for the first well; and
the computing comprises computing the pore pressure using the resistivity data for the first well and the resistivity data for the second well.

18. The system of claim 16, wherein the computed data comprises a fracture gradient.

19. The system of claim 18, wherein the retrieving comprises retrieving at least a portion of the input data from settings maintained by a calculation engine resident on the system.

20. A computer-program product comprising a non-transitory computer-usable medium having computer-readable program code embodied therein, the computer-readable program code adapted to be executed to implement a method comprising:
collecting channel data in real-time as the channel data is generated, the channel data comprising measured physical properties determined by sensors in use at a site of a first well;
providing a real-time display of performance data for the first well;
retrieving input data comprising historical performance data for a second well, wherein the historical performance data comprises an event for the second well;
updating the real-time display with the event for the second well; and
generating an alert responsive to a determination that a measured depth for the first well is within a preconfigured distance of a depth associated with the event for the second well.

\* \* \* \* \*